(12) United States Patent
Martin et al.

(10) Patent No.: US 11,802,780 B2
(45) Date of Patent: Oct. 31, 2023

(54) DISPLAY SYSTEMS AND METHODS FOR AIRCRAFT

(71) Applicant: BOMBARDIER INC., Dorval (CA)

(72) Inventors: Christian Martin, Newmarket (CA); Christopher Martin, Bradford (CA); Jason Naipaul, Toronto (CA); Nami Bae, Montreal (CA); Mark Schlegel, Kingman, KS (US); William Murray Colquhoun, Wichita, KS (US); Anthony J. Barber, Dollard-des-Ormeaux (CA); Natalie Wong, LaSalle (CA)

(73) Assignee: BOMBARDIER INC., Dorval (CA)

( * ) Notice: Subject to any disclaimer, the term of this patent is extended or adjusted under 35 U.S.C. 154(b) by 210 days.

(21) Appl. No.: 17/082,440

(22) Filed: Oct. 28, 2020

(65) Prior Publication Data

US 2021/0123770 A1    Apr. 29, 2021

Related U.S. Application Data

(60) Provisional application No. 62/926,798, filed on Oct. 28, 2019.

(51) Int. Cl.
*G01C 23/00* (2006.01)
*G08G 5/00* (2006.01)
*G02B 27/01* (2006.01)

(52) U.S. Cl.
CPC ......... *G01C 23/00* (2013.01); *G02B 27/0172* (2013.01); *G08G 5/0047* (2013.01);
(Continued)

(58) Field of Classification Search
CPC ................ G01C 23/00; G02B 27/0172; G02B 2027/0141; G02B 2027/0165;
(Continued)

(56) References Cited

U.S. PATENT DOCUMENTS

| | | |
|---|---|---|
| 7,191,406 B1 | 3/2007 | Barber et al. |
| 8,195,347 B2 | 6/2012 | Boorman |

(Continued)

OTHER PUBLICATIONS

Thurber, This Hud's for You, Dec. 26, 2018, https://www.ainonline.com/aviation-news/business-aviation/2018-12-26/huds-you.

*Primary Examiner* — Bryan Earles
(74) *Attorney, Agent, or Firm* — Norton Rose Fulbright Canada LLP

(57) ABSTRACT

A display system of an aircraft includes a display device defining a display area, a vision system for generating an image of an operating environment of the aircraft on the display area, data processors operatively coupled to the display device and the vision system, and non-transitory machine-readable memory operatively coupled to the one or more data processors and storing instructions executable by the one or more processors and configured to cause the one or more processors to, when a condition of the aircraft is met, cause an alteration of a display of flight information on the display area to declutter a cutout region in the image generated by the vision system, the cutout region devoid of imaging generated by the vision system and displaying an Approach Lighting System (ALS) of a runway of intended landing for the aircraft.

19 Claims, 11 Drawing Sheets

(52) U.S. Cl.
CPC ............... *G02B 2027/0141* (2013.01); *G02B 2027/0165* (2013.01); *G02B 2027/0181* (2013.01)

(58) Field of Classification Search
CPC ......... G02B 2027/0181; G08G 5/0047; G08G 5/0021; G08G 5/025; B64D 43/00; B64F 1/20
See application file for complete search history.

(56) References Cited

U.S. PATENT DOCUMENTS

| | | |
|---|---|---|
| 8,914,166 B2 | 12/2014 | He |
| 9,407,826 B1 | 8/2016 | Tiana |
| 9,936,191 B2 | 4/2018 | Wyatt et al. |
| 10,308,371 B1 * | 6/2019 | Tiana .................... G08G 5/0021 |
| 10,598,932 B1 * | 3/2020 | Marshall ................. G06T 11/00 |
| 10,777,013 B1 * | 9/2020 | Lange .................... B64D 45/08 |

* cited by examiner

DISPLAY SYSTEMS AND METHODS FOR AIRCRAFT

CROSS-REFERENCE TO RELATED APPLICATION AND CLAIM OF PRIORITY

The present application claims priority from U.S. Provisional Patent Application No. 62/926,798, filed on Oct. 28, 2019, the entire contents of which are incorporated by reference herein.

FIELD

This relates generally to aircraft, and more particularly to aircraft display systems.

BACKGROUND

An electronic primary flight display (PFD) of an aircraft is used to display primary flight information such as an airspeed indicator, turn coordinator, altimeter and a vertical speed indicator, for example. Other flight information can include a horizontal situation indicator, a lateral and vertical deviation scale, and data readouts from real-time sensor inputs. A PFD can also be used to display other awareness-type information such as synthetic vision (SV) to provide improvements in situational awareness for aircraft pilots. A typical SV system uses a computer-generated image of the external scene topography generated from aircraft attitude, navigation data, and data of the terrain, runway and obstacles (e.g., towers, buildings and other environment features) stored in a database. An enhanced SV system can be integrated into a synthetic vision guidance system (SVGS) or a combined vision guidance system (CVGS) with additional monitors.

Similar flight information and synthetic vision can be displayed on other types of aircraft displays, such as a head-up display (HUD) which can include a transparent display that can present data without requiring aircraft pilots to look away from their usual point out the windshield of the aircraft.

The presentation of flight information and awareness-type information on the PFD or on the HUD can be distracting to a pilot during time-critical tasks in low visibility operations. When bad weather is present, the pilot needs to focus on the task at hand to pick up the visual cues when approaching near the runway. Some of these visual cues include approach lighting systems (if installed) or runway visual references (such as touchdown zone lights or markings, centerline lights or markings, runway edge lights, runway end lights, etc.) that airports are required to provide and maintain.

SUMMARY

According to an aspect, there is provided a display system of an aircraft, the system comprising: a display device defining a display area; a vision system for generating an image of an operating environment of the aircraft on the display area; one or more data processors operatively coupled to the display device and the vision system; and non-transitory machine-readable memory operatively coupled to the one or more data processors and storing instructions executable by the one or more processors and configured to cause the one or more processors to: when a condition of the aircraft is met, cause an alteration of a display of flight information on the display area to declutter a cutout region in the image generated by the vision system, the cutout region devoid of imaging generated by the vision system and displaying an Approach Lighting System (ALS) of a runway of intended landing for the aircraft.

In some embodiments, the instructions are configured to cause the one or more processors to: when the condition of the aircraft is met, cause an alteration of a display of flight information on the display area to declutter an area of the display area that is proximate the cutout region.

In some embodiments, the vision system comprises one or more of a synthetic vision system and an enhanced vision system.

In some embodiments, the cutout region is devoid of synthetic vision imaging generated by the vision system.

In some embodiments, the cutout region is devoid of enhanced vision imaging generated by the vision system.

In some embodiments, the condition comprises a flight phase.

In some embodiments, the condition comprises an altitude of the aircraft.

In some embodiments, the instructions are configured to cause the one or more processors to: display enhanced vision in the cutout region of the display area.

In some embodiments, the alteration of the display of flight information on the display area comprises moving the flight information.

In some embodiments, the alteration of the display of flight information on the display area comprises removing the flight information.

In some embodiments, the alteration of the display of flight information on the display area comprises replacing the flight information.

In some embodiments, the alteration of the display of flight information on the display area comprises resizing the flight information.

In some embodiments, the alteration of the display of flight information on the display area comprises increasing transparency of the flight information.

In some embodiments, the alteration of the display of flight information comprises reducing overlap of the flight information with the cutout region.

In some embodiments, the flight information comprises angle of attack information.

In some embodiments, the flight information comprises attitude information.

In some embodiments, the flight information comprises lateral deviation information.

In some embodiments, the flight information comprises at least one of compass rose information, navigation information, course information, range information, altitude information, wind vector information, and information when selected minimums are reached.

In some embodiments, the display device is a heads up display (HUD) device.

In some embodiments, the display device is a heads down display (HDD) device.

In some embodiments, the vision system is configured to operate in a combined vision guidance operating mode.

In some embodiments, the display area includes a display area defined on a heads up display (HUD) device and a display area defined on a heads down display (HDD) device, and the alteration of the display of flight information on the display area includes an alteration of a display of flight information on the display area defined on the HUD device synchronized with an alteration of a display of flight information on the display area defined on the HDD device.

According to another aspect, there is a provided an aircraft comprising the display system as defined herein.

According to a further aspect, there is a provided a method for altering a display on a display area of an aircraft, the method comprising: determining whether a condition of the aircraft is met; and when the condition is met, causing an alteration of a display of flight information on the display area to declutter a cutout region in an image generated by a vision system, the cutout region devoid of imaging generated by the vision system and displaying an Approach Lighting System (ALS) of a runway of intended landing for the aircraft.

In some embodiments, the method further comprises when the condition of the aircraft is met, causing an alteration of a display of flight information on the display area to declutter an area of the display area that is proximate the cutout region.

In some embodiments, the cutout region is devoid of synthetic vision imaging generated by the vision system.

In some embodiments, the cutout region is devoid of enhanced vision imaging generated by the vision system.

In some embodiments, the condition comprises a flight phase.

In some embodiments, the condition comprises an altitude of the aircraft.

In some embodiments, the method further comprises displaying enhanced vision in the cutout region of the display area.

In some embodiments, the alteration of the display of flight information on the display area comprises moving the flight information.

In some embodiments, the alteration of the display of flight information on the display area comprises removing the flight information.

In some embodiments, the alteration of the display of flight information on the display area comprises replacing the flight information.

In some embodiments, the alteration of the display of flight information on the display area comprises resizing the flight information.

In some embodiments, the alteration of the display of flight information on the display area comprises increasing transparency of the flight information.

In some embodiments, the alteration of the display of flight information comprises reducing overlap of the flight information with the cutout region.

In some embodiments, the flight information comprises angle of attack information.

In some embodiments, the flight information comprises attitude information.

In some embodiments, the flight information comprises lateral deviation information.

In some embodiments, the flight information comprises at least one of compass rose information, navigation information, course information, range information, altitude information, wind vector information, and information when selected minimums are reached.

In some embodiments, the display area is defined on a heads up display (HUD) device.

In some embodiments, the display area is defined on a heads down display (HDD) device.

In some embodiments, the display area is defined on a primary flight display.

In some embodiments, the display area includes a display area defined on a heads up display (HUD) device and a display area defined on a heads down display (HDD) device, and the alteration of the display of flight information on the display area includes an alteration of a display of flight information on the display area defined on the HUD device synchronized with an alteration of a display of flight information on the display area defined on the HDD device.

In some embodiments, the method further comprises when a reversion condition is met, reverting the display of the display area to the display of flight information prior to the alteration.

In some embodiments, the reversion condition comprises actuation of a take-off go-around (TOGA) switch.

In some embodiments, the reversion condition comprises a partial thrust go-around performed by increasing a throttle level angle by twenty-five degrees.

In some embodiments, the reversion condition comprises landing of the aircraft.

According to another aspect, there is provided a computer program product for a method for altering a display on a display area of an aircraft, the computer program product comprising a non-transitory computer readable storage medium containing program code, the program code being readable/executable by a computer, processor or logic circuit to perform the method defined herein.

Other features will become apparent from the drawings in conjunction with the following description.

BRIEF DESCRIPTION OF DRAWINGS

In the figures which illustrate example embodiments.

DETAILED DESCRIPTION

Figure 1:
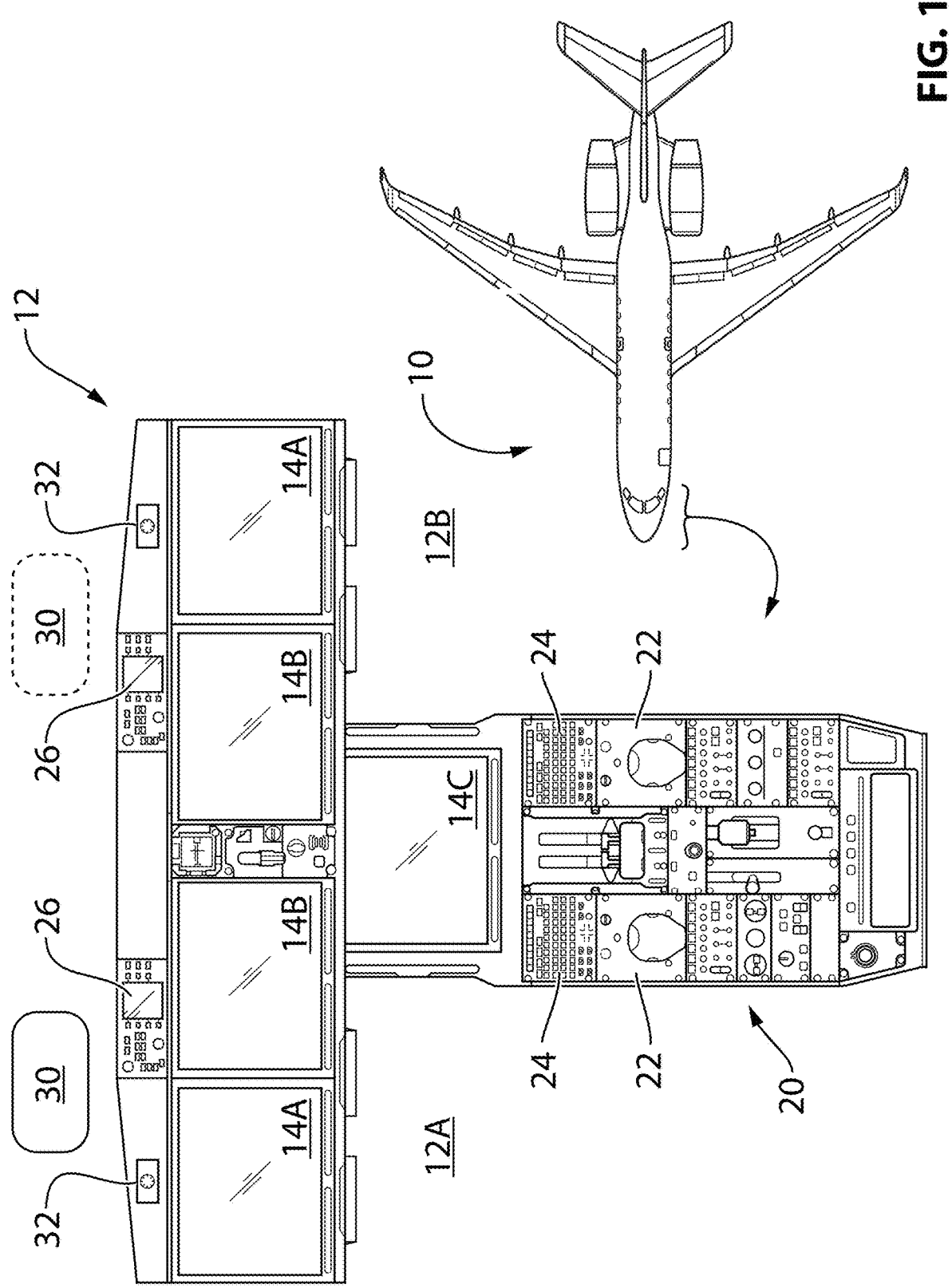
FIG. 1 shows an aircraft flight deck and a corresponding exemplary aircraft comprising the flight deck, according to an embodiment.

Systems and methods for assisting a pilot during flight of an aircraft are disclosed herein. In various embodiments, the systems and methods disclosed herein can improve the operation of an aircraft flight deck by providing visualization techniques to declutter (such as alter, displace or remove) the display of flight information (such as flight symbology and characters) used on a primary flight display (PFD) or other types of aircraft displays, to reduce interference with other visual cues (such as approach lighting system, runway markings and/or runway environment) and aid a pilot in visually picking up such visual cues when approaching a runway.

Systems and methods disclosed herein for decluttering flight information on an aircraft display can improve a transition from instrument landing to visual landing during an aircraft landing procedure.

In some embodiments, the systems and methods disclosed herein can enhance the situational awareness of the pilot during phases of flight of relatively high workload. Such enhancement in situational awareness can allow the pilot to confidently fly in low visibility conditions, especially in poor visibility conditions due to weather or haze, and at night, and can improve flight safety by reducing the risk of flight into terrain. The systems and methods disclosed herein can be used during various phases of operation (e.g., flight) of aircraft and when actual outside weather and visibility conditions are substantially poor.

The following disclosure describes systems and methods useful in providing equivalent visual operation (EVO) for the flight crew of an aircraft independent of the actual outside weather and visibility conditions. For example, the systems and methods described herein can contribute toward the ability to use the same or substantially the same operating procedures for an aircraft independently of the actual weather conditions. In some embodiments, the systems and methods described herein can, for example, allow a successful landing at a decision height (DH) or a decision altitude (DA) at which, if the required visual reference (such as an approach lighting system, runway markings or runway environment) to continue an approach is visible to the pilot. Otherwise, if the required visual reference to continue an approach is not visible to the pilot, the pilot must initiate a missed approach (e.g., go around).

The systems and methods described herein can, in some embodiments, create a virtual visual flight environment for the flight crew, independent of the actual outside weather and visibility conditions, through the use of synthetic vision (SV) and enhanced vision (EV) technologies. In some embodiments, the virtual visual environment can comprise a complementary use of SV and EV technologies by combining (e.g., fusing) SV and EV information to generate images that contain both SV and EV information merged together. The systems and methods described herein can, in some embodiments, contribute toward enabling low visibility approach and landing operational credit by other than CAT II/III capable equipage at an increased number and type of runways when compared to currently allowed low visibility operations.

The systems and methods described herein can, in some embodiments, declutter information on an aircraft display to provide aircraft operators with a better visibility of visual cues within an Approach Lighting System (ALS) area and the runway area, for example, during a two-way callout procedure (for example, at a decision height/altitude (DH/DA) and at 100 feet above ground level (AGL).

Aspects of various embodiments are described through reference to the drawings.

FIG. 1 shows an exemplary aircraft 10 and a partial schematic representation of flight deck 12 which can be part of aircraft 10. Aircraft 10 can be a corporate, private, commercial or any other type of aircraft. For example, aircraft 10 can be a fixed-wing aircraft. In some embodiments, aircraft 10 can be a narrow-body, twin engine jet airliner or an ultra-long range business jet. Aircraft 10 can comprise a vision guidance system as described further below. Flight deck 12 can comprise additional or fewer elements than those shown and described herein. Flight deck 12 can comprise left portion 12A intended to be used by a pilot (sometimes referred as "captain") of aircraft 10 and right portion 12B intended to be used by a co-pilot (sometimes referred as "first officer") of aircraft 10. Left portion 12A and right portion 12B can comprise functionally identical components so that at least some operational redundancy is provided between left portion 12A and right portion 12B of flight deck 12. As used herein, the term "flight crew" is intended to encompass one or more individuals responsible for the operation of aircraft 10 during flight. Such individuals can, for example, include the pilot and/or the co-pilot.

Flight deck 12 can comprise one or more display devices defining respective display areas. In the exemplary configuration of flight deck 12 shown in FIG. 1, left portion 12A and right portion 12B can each comprise primary flight display 14A (referred hereinafter as "PFD 14A") and multifunction display 14B (referred hereinafter as "MFD 14B"). In some embodiments, flight deck 12 can also comprise an additional display 14C provided in pedestal region 20 of flight deck 12 and that can be shared between the pilot and the co-pilot during normal operation of aircraft 10. PFD 14A, MFD 14B and shared display 14C can each be considered a "head-down display" (HDD) and are referred generally herein as HDD 14. HDDs 14 can include one or more cathode-ray tubes (CRTs), liquid crystal displays (LCDs), plasma displays, light-emitting diode (LED) based displays or any type of display device that can be suitable for use in flight deck 12. HDDs 14 can be configured to dynamically display operational and status information about various systems of aircraft 10, information related to flight/mission planning, maps and any other information that can be useful for the flight crew (e.g., pilot(s)) during the operation of aircraft 10. HDDs 14 can facilitate dialog between the flight crew and various systems of aircraft 10 via suitable graphical user interfaces.

Flight deck 12 can comprise one or more data input devices such as, for example, one or more cursor control devices 22, one or more multifunction keypads 24, one or more (e.g., standalone or multifunction) controllers 26 (referred hereinafter in the singular) and one or more HUD mode selectors 32 that can permit data entry by the flight crew. For example, such controller 26 can be disposed in glare shield panel 28 above PFD 14A and MFD 14B. Controller 26 can be of the type known as a "control tuning panel" (CTP), a "radio tuning panel" (RTP) or a "radio tuning unit" (RTU). For example, controller 26 can facilitate radio management functions and can provide a convenient means of selecting frequencies, codes, channels, operating modes, volume and optionally other functions. Controller 26 can be configured to facilitate the operation of a vision guidance system of aircraft 10.

Flight deck 12 can also comprise one or more head-up display devices 30 (referred hereinafter as "HUD 30") which can comprise transparent displays that can present data without requiring the pilots to look away from their usual point out the windshield of aircraft 10. HUD 30 can present information to a pilot while the pilot's head is positioned "up" and looking forward, instead of angled down looking at lower instruments or displays such as HDDs 14. In various embodiments, right and left portions 12A, 12B can each comprise HUD 30 or, alternatively, flight deck 12 can comprise only one HUD 30 disposed in left portion 12A of flight deck 12 for example. HUD mode selectors 32 can be disposed in glare shield panel 28 of flight deck 12. HUD mode selector 32 can comprise a pilot input device (e.g., knob) that is actuatable by the pilot to facilitate the selection of an operating (e.g., display) mode for HUD 30.

Even though aspects of this disclosure refer specifically to the use of display devices onboard aircraft 10, it is understood that the display system of aircraft 10 could be used in conjunction with one or more display devices that are off of aircraft 10 (e.g., at a ground station) to assist a remote (e.g., ground-based) operator (e.g., pilot) of aircraft 10.

Figure 2:
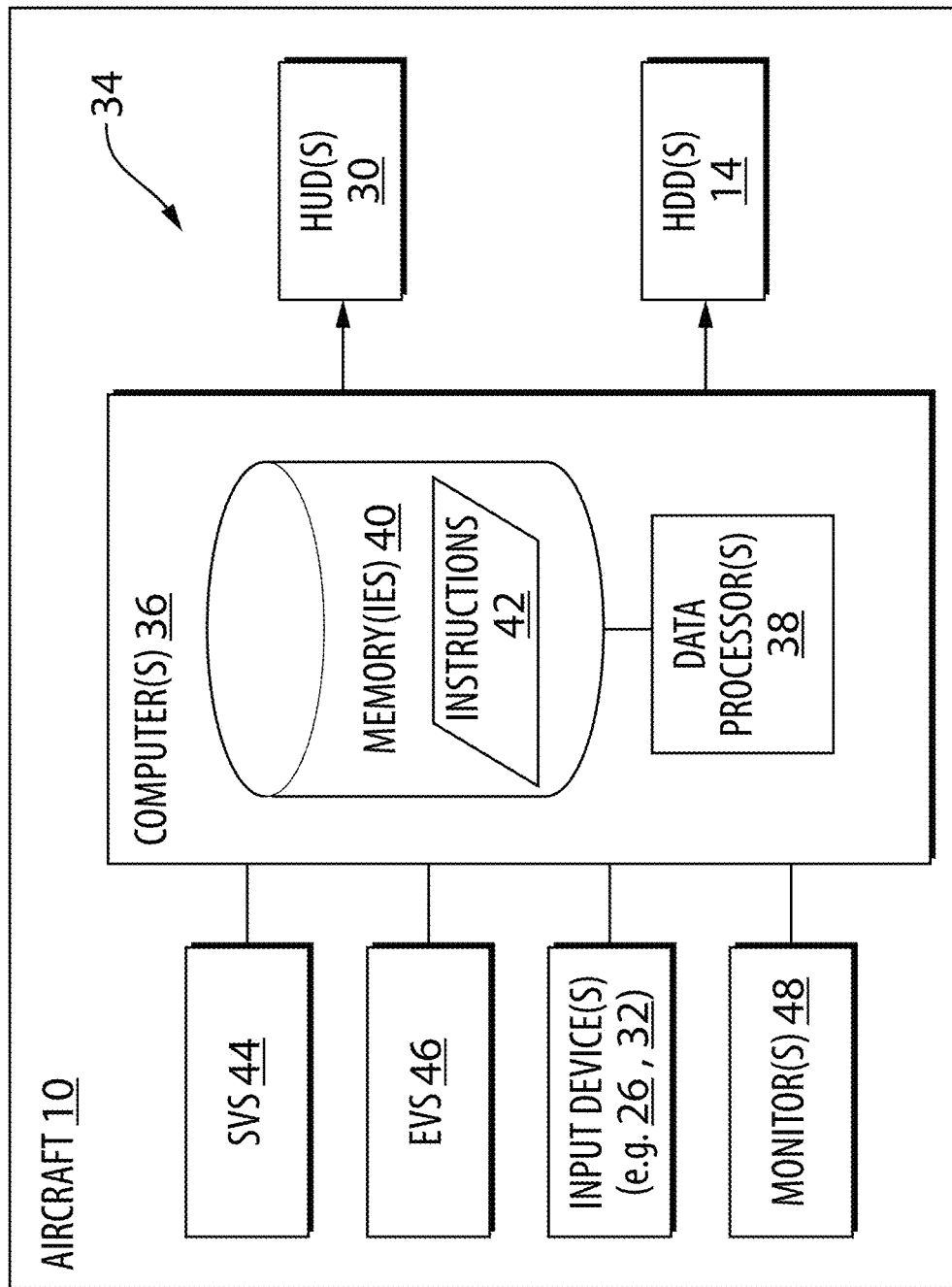
FIG. 2 shows a schematic representation of a display system of the aircraft of FIG. 1, according to an embodiment.

FIG. 2 shows a schematic representation of an example display system 34 of aircraft 10. Part(s) of display system 34 can be integrated with flight deck 12. Display system 34 can comprise one or more computers 36 (referred hereinafter in the singular) operatively coupled to one or more display devices such as HUD 30 and/or HDD 14 of flight deck 12. Computer 36 can comprise one or more data processors 38 (referred hereinafter in the singular) and one or more computer-readable memories 40 (referred hereinafter in the singular) storing machine-readable instructions 42 executable by data processor 38 and configured to cause data processor 38 to generate one or more outputs (e.g., signals) for causing the execution of steps of the methods described herein.

Computer 36 can be part of an avionics suite of aircraft 10. For example, in some embodiments, computer 36 can carry out additional functions than those described herein including the management of one or more graphic user interfaces of flight deck 12 and/or other part(s) of aircraft 10. In various embodiments, computer 36 can comprise more than one computer or data processor where the methods disclosed herein (or part(s) thereof) could be performed using a plurality of computers 36 or data processors 38, or, alternatively, be performed entirely using a single computer 36 or data processor 38.

Data processor 38 can comprise any suitable device(s) configured to cause a series of steps to be performed by computer 36 so as to implement a computer-implemented process such that instructions 42, when executed by computer 36 or other programmable apparatus, can cause the functions/acts specified in the methods described herein to be executed.

Memory 40 can comprise any suitable machine-readable storage medium. Memory 40 can comprise non-transitory computer readable storage medium such as, for example, but not limited to, an electronic, magnetic, optical, electromagnetic, infrared, or semiconductor system, apparatus, or device, or any suitable combination of the foregoing. Memory 40 can include a suitable combination of any type of computer memory that is located either internally or externally to computer 36. Memory 40 can comprise any storage means (e.g. devices) suitable for retrievably storing machine-readable instructions 42 executable by data processor 38.

Various aspects of the present disclosure can be embodied as systems, devices, methods and/or computer program products. Accordingly, aspects of the present disclosure can take the form of an entirely hardware embodiment, an entirely software embodiment or an embodiment combining software and hardware aspects. Furthermore, aspects of the present disclosure can take the form of a computer program product embodied in one or more non-transitory computer readable medium (ia) (e.g., memory 40) having computer readable program code (e.g., instructions 42) embodied thereon. Computer program code for carrying out operations for aspects of the present disclosure in accordance with instructions 42 can be written in any combination of one or more programming languages. Such program code can be executed entirely or in part by computer 36 or other data processing device(s). It is understood that, based on the present disclosure, one skilled in the relevant arts could readily write computer program code for implementing the methods disclosed herein.

Computer 36 can be operatively connected to HUD 30 and/or HDD 14 so that output from computer 36 can at least partially control the operation of HUD 30 and/or HDD 14. Display system 34 can also comprise a vision system for generating images of an operating environment (for e.g., flying environment) of aircraft 10, such as synthetic vision system 44 (referred hereinafter as "SVS 44") and enhanced vision system 46 (referred hereinafter as "EVS 46"), as well as pilot input devices such as controller 26 and HUD mode selector 32 and one or more system monitors 48. Computer 36 can be operatively connected to SVS 44, EVS 46, the input devices 26, 32 and system monitor(s) 48.

Display system 34 can be operated in one or more operating modes. For example, display system 34 can be operated in a SV operating mode which includes the use of SV without EV. Display system 34 can also be operated in a combined vision (CV) operating mode which includes the use of a combination of SV and EV.

Figure 3:
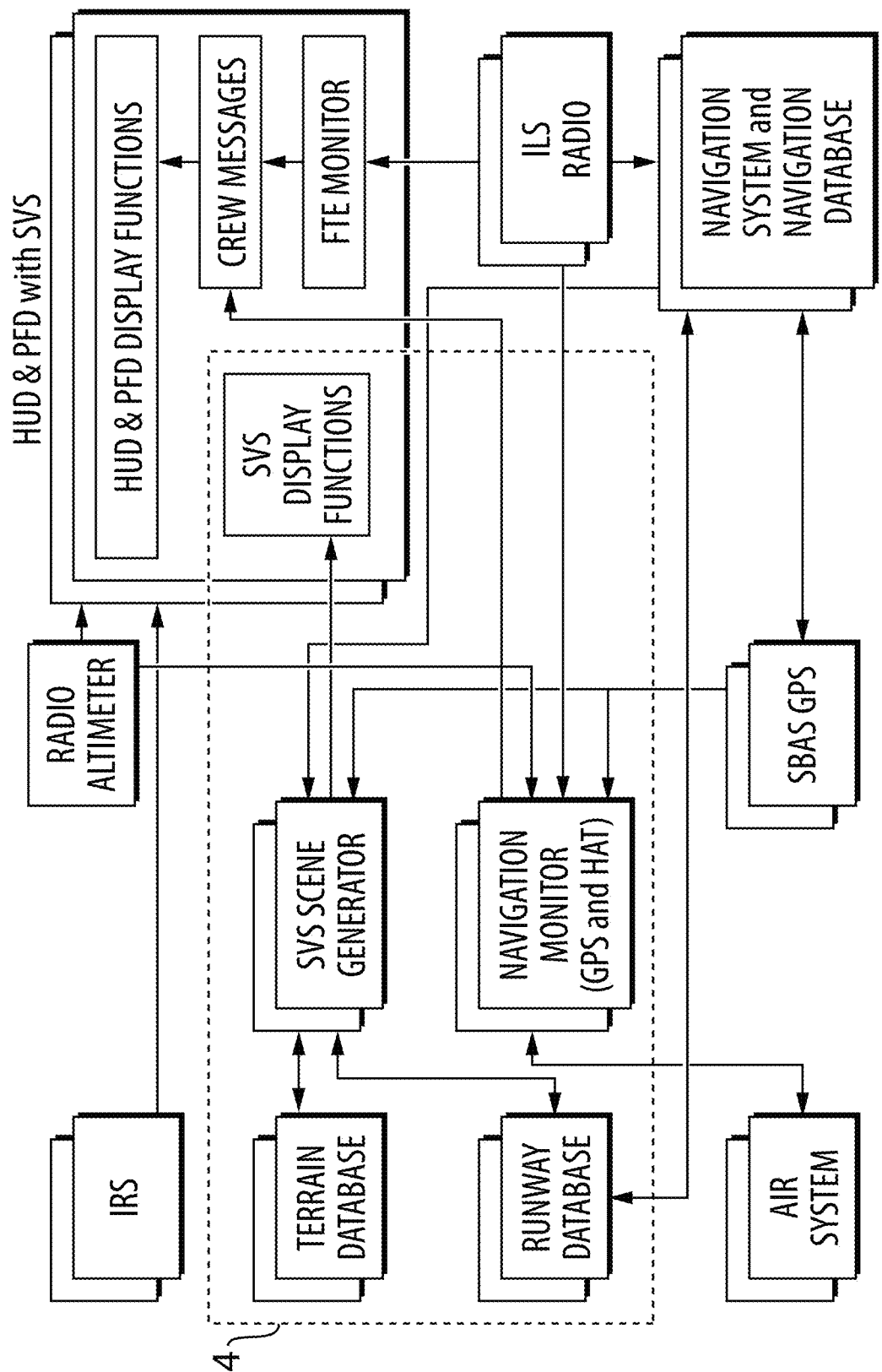
FIG. 3 is a schematic representation of a synthetic vision system of the aircraft of FIG. 1, according to an embodiment.

FIG. 3 is a schematic representation of an exemplary SVS 44 of display system 34. SV can provide significant improvements in situational awareness for aircraft pilots. A typical SV system uses a computer-generated image of the external scene topography generated from aircraft attitude, navigation data, and data of the terrain and obstacles stored in one or more databases stored onboard aircraft 10. In some embodiments, SVS 44 can comprise a terrain database, a runway database, a navigation monitor and a scene generator. In some embodiments, SVS 44 can be operatively coupled to PFD 14A, HUD 30, a radio altimeter, inertial reference system (IRS), air data system, global positioning system (GPS), a navigation system and database, radio equipment of an instrument landing system (ILS) and a flight technical error (FTE) monitor.

SVS 44 can be used to provide computer-generated SV images for display on PFD 14A, and/or on HUD 30. In some embodiments, synchronized SV images can be displayed simultaneously on PFD 14A and on HUD 30. In some embodiments, SV images can contain symbols or visual aids to assist the pilot with controlling aircraft 10. For example, SV images can contain an outline outlining the destination runway.

SVS 44 can be integrated into a synthetic vision guidance system (SVGS) or a combined vision guidance system (CVGS). For example, SVS 44 can be integrated into a SVGS operating mode that both provides situation awareness and acts as a guidance system that works in conjunction with a navigation guidance system, to provide operational capabilities. A CVGS operating mode combines an SVGS operating mode with EVS 46 in operation.

Figure 4:
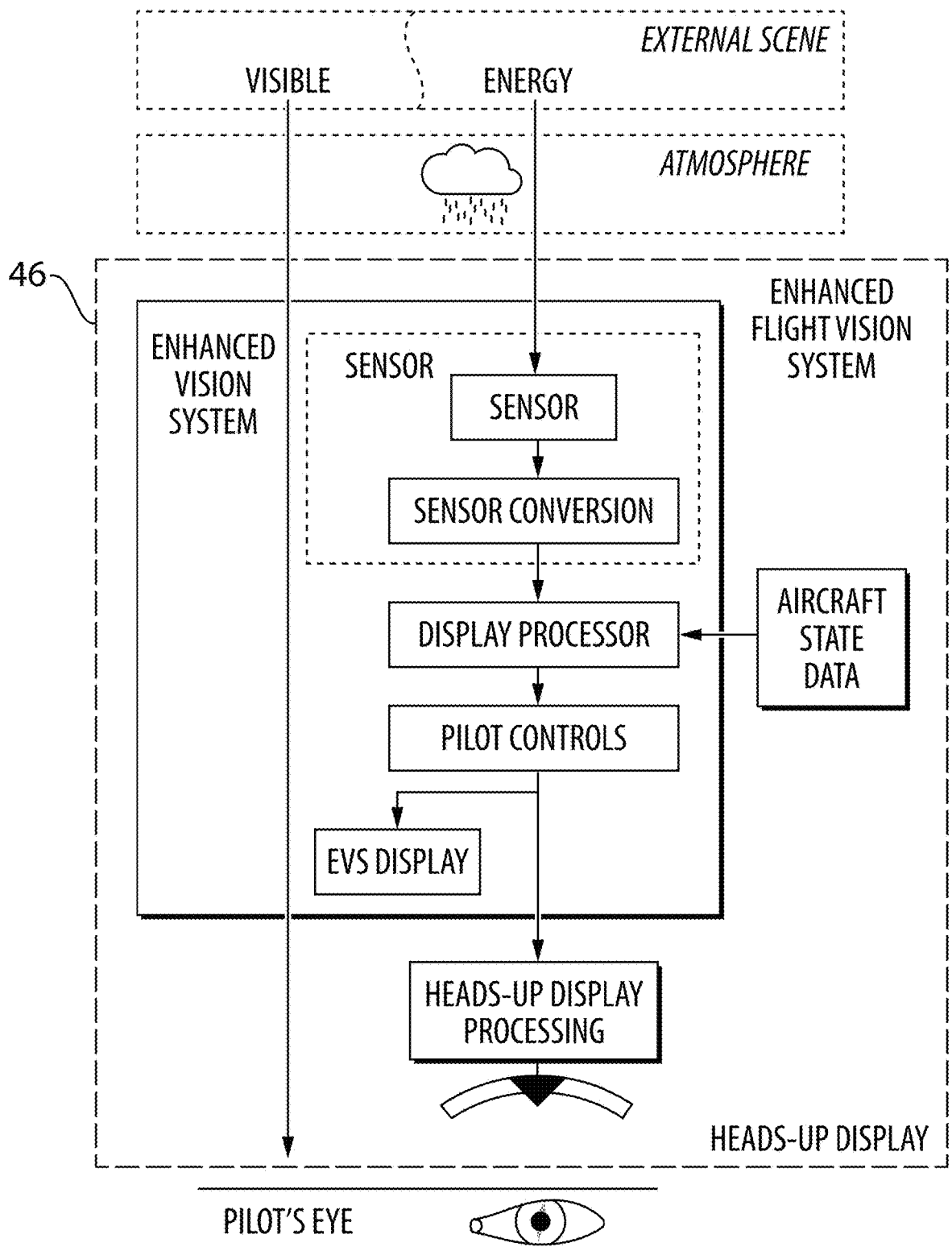
FIG. 4 is a schematic representation of an enhanced vision system of the aircraft of FIG. 1, according to an embodiment.

FIG. 4 is a schematic representation of an example EVS 46 of display system 34. EVS 46 can provide a display of the external scene to the aircraft pilots by using an imaging sensor mounted to aircraft 10. EVS 46 can provide the pilot with an image which can enhance unaided human vision. EVS 46 can include one or more forward-looking imaging sensors such as a color camera, infrared camera or radar. The image can be provided to the pilot via a display device inside aircraft 10. EVS 46 can be operatively coupled to receive aircraft state data and also be operatively coupled to PFD 14A and/or HUD 30. EVS 46 can generate enhanced image data representative of a three-dimensional perspective of the scene outside (e.g., in front of) aircraft 10 for subsequent presentation on a display device such as PFD 14A and/or HUD 30 for example.

EVS 46 can be used to provide EV images for display on HUD 30. In some embodiments, synchronized EV images can be displayed simultaneously on HDD 14 (e.g., MFD 14B or PFD 14A) and on HUD 30. In some embodiments, EV images can contain symbols or visual aids to assist the pilot with controlling aircraft 10. For example, EV images can contain an outline outlining runway approach lights.

A combined vision (CV) image combines SV and EV information on the same image. A CV image makes complementary use of SV and EV technologies by fusing/merging SV and EV information on a common image using a suitable method. For example, the advantages of EV can compensate for the limitations of SV and vice versa. Accordingly, the combination of SV and EV can provide a visual flight environment for the flight crew that is independent of the outside weather and visibility conditions. In some embodiments, the combination of SV and EV can provide an EVO environment so that the pilot flying has a substantially full "out the window" display.

In some embodiments, a CV image can include SV images and/or EV images of a destination runway environment, such as a runway outline.

In some embodiments, a CV image can be an inset of a EV image within an SV image. In some embodiments, a CV image can be a split between an EV image and a separate SV image.

In some embodiments, synchronized CV images can be displayed simultaneously on PFD 14A and on HUD 30.

Selected synthetic vision, for example, SV images or information, can be removed (referred to as "cut out", herein) from a region (referred to as "cutout region", herein) of an image, such as a CV image displayed on PFD 14A, and/or on HUD 30, such that the cutout region is devoid of certain imaging, such as synthetic vision imaging and/or enhanced vision imaging, and remaining SV images surround a cutout region Removal of SV images from a cutout region can be performed once a condition is met. In some embodiments, the condition can be a flight phase or an altitude of aircraft 10, such as a distance from a decision height (DH) or decision altitude (DA) or if DH/DA is reached. In some embodiments, removal of SV images or information can allow EV images or information to be displayed, allowing operators to have better visibility of EV images or information on the display. In some embodiments, removal of SV images or information can be replaced with EV images or information. In some embodiments, removal of SV images or information can be replaced with non-enhanced vision (e.g. natural "out the window" cues).

In some embodiments, a cut out can only be performed when display system 34 is in a CVS mode, as described in further detail below.

In some embodiments, selected SV images or information can be removed or cut out from an ALS (approach lighting system) cutout region of an image displayed on PFD 14A, and/or on HUD 30. An ALS cutout region on a display can display an ALS of a runway of intended landing for aircraft 10. In some embodiments, an ALS cutout region can be determined based at least in part on data from the runway database of SVS 44. In some embodiments, an ALS cutout region can be determined based at least in part on detected approach lighting by EVS 46. Thus, an ALS cutout region can allow approach lighting to be aligned with SV images or information being displayed. In some embodiments, an ALS cutout region can serve as a means to validate the SV image from the EV image, for example, based on the alignment of the SV image and EV image relative to each other. Furthermore, an ALS cutout can allow EV images and visual cues to be more clearly displayed within that region, for example, an EV image outlining runway approach lights of an ALS.

Figure 9:
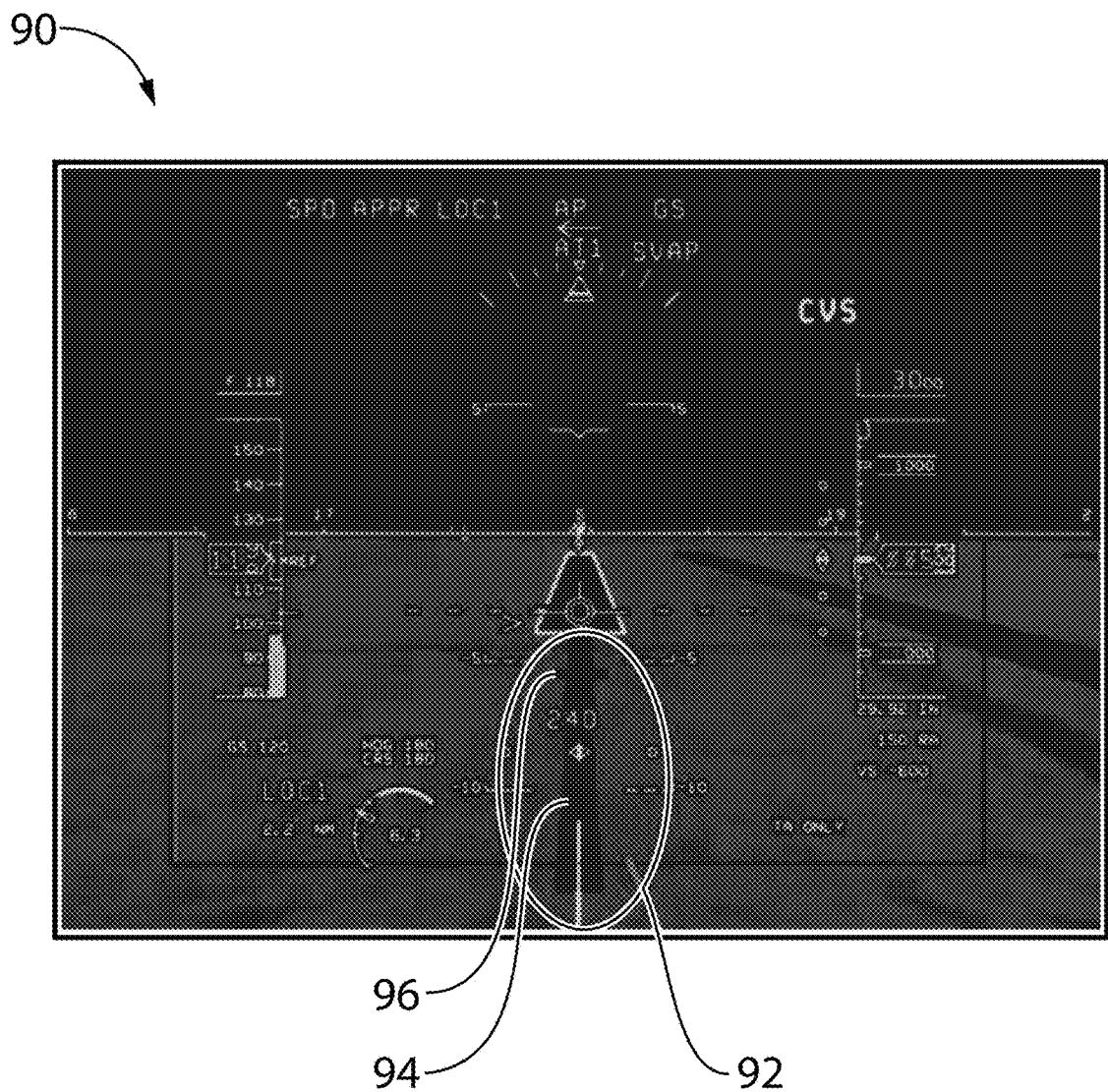
FIG. 9 is another example image of an unmodified HUD layout which combines synthetic vision generated using the synthetic vision system of FIG. 3 and enhanced vision generated using the enhanced vision system of FIG. 4, according to an embodiment.

In some embodiments, an ALS cutout region can include a longitudinal strip and a horizontal bar. FIG. 9 illustrates an example combined vision image 90 having an ALS cutout region 92 having a longitudinal strip 94 and a horizontal bar 96.

In some embodiments, horizontal bar cutout region, such as horizontal bar 96, is not included in an ALS cutout region, as horizontal bar lights are not always collocated with the horizontal bar cutout region.

Removal of selected SV images or information from a cutout region, such as an ALS cutout region, of a display can allow EV images to provide visual reference to a flight crew to recognize runway visual cues, for example, approach lights of an approach lighting system (ALS) (if installed) or destination runway lights, and to continue with landing.

It will be appreciated that other regions of SV images or information on a display can be removed or cut out. For example, runway itself can also be cut out of a synthetic vision image.

PFD 14A and/or HUD 30 can also display flight information, including symbology, typically found on PFD 14A and/or HUD 30, for example, indicating information related to the aircraft's attitude, airspeed, and altitude, navigational information. Other flight information can also be included such as the horizontal situation indicator, lateral and vertical deviation scale, and data readouts from real-time sensor inputs. Flight information can comprise a textual and/or a graphical indication and in some embodiments may include a data annunciation. In some embodiments, other symbols or visual aids to assist the pilot with controlling aircraft 10 can be displayed.

Flight information, for example, in the form of data annunciation, presented in various areas and indicators of display device such as PFD 14A and/or HUD 30 can be based on real-time data associated with the operation of aircraft and received as input, for example, from one or more of monitor(s) 48 and input devices 26, 32. The information can be presented using graphical objects (e.g., lines, symbols or other non-textual objects) and/or textual objects.

Figure 5:
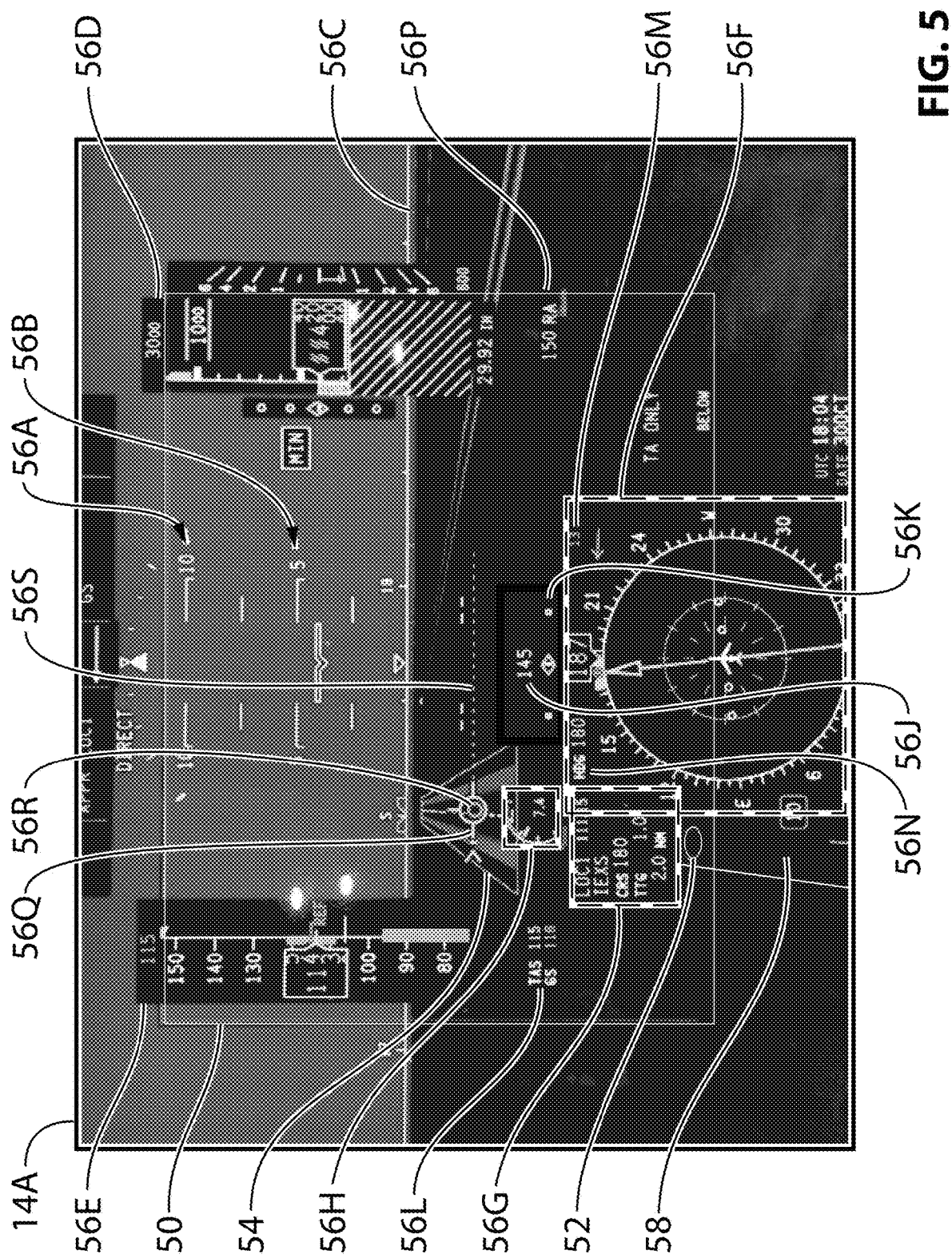
FIG. 5 is an example image of an unmodified PFD layout which combines synthetic vision generated using the synthetic vision system of FIG. 3 and enhanced vision generated using the enhanced vision system of FIG. 4, according to an embodiment.

FIG. 5 is an example of a layout displayed on PFD 14A using display system 34, including a CV image 50 that combines SV and EV information on the same image, and surrounding SV images. CV image 50 can contain SV images such as runway outline 54, outlining a destination runway.

As shown by way of example in FIG. 5, selected SV images or information can be cut out from an ALS (approach lighting system) cutout region 58 of display on PFD 14A. ALS cutout region 58 can correspond to an ALS of a runway of intended landing for aircraft 10. Thus, ALS cutout region 58 can allow approach lighting to be aligned with SV images or information being displayed.

CV image 50 can include display elements such as EV images, for example, runway approach lights 52, and ALS cutout region 58 can allow for better visibility of runway approach lights 52 due to the absence of SV images in the region.

FIG. 5 shows information displayed in a display area of PFD 14A, which can include flight information typically found on PFD 14A and can contain symbology and data annunciation indicating information related to the aircraft's attitude, airspeed, and altitude, navigational information. The flight information can comprise a textual and/or a graphical indication. As shown in FIG. 5, some flight information may be displayed in the same vicinity and proximate ALS cutout region 58 and runway approach lights 52, as well as runway outline 54. Thus, there may be an issue of overlap or visual occlusion.

As shown in FIG. 5, in some embodiments, flight information on PFD 14A can include: a 10° pitch attitude marking 56A, a 5° pitch attitude marking 56B, a horizon line 56C, an altitude tape 56D, an airspeed tape 56E, a horizontal situation indicator (HSI) compass rose 56F, a navigation source and range information 56G, an angle of attack indicator 56H, a radar altimeter minimum 56J, a localizer (LOC) scale 56K for lateral deviation, a true airspeed (TAS) and ground speed (GS) indicator 56L, a wind vector 56M, a heading (HDG) data status 56N, a radar altimeter minimum (RA MIN) readout 56P, a flight path vector (FPV) 56Q, a command guidance cue 56R, and a flight path angle reference cue (FPARC) 56S.

In some embodiments, flight information on PFD 14A can also include a −5° pitch attitude marking, a −10° pitch attitude marking, and other suitable flight information that are not illustrated, but may be displayed during operation of aircraft 10.

Systems and methods disclosed herein can improve the cluttering of flight information that may occlude visual cues that are depicted proximate ALS cutout region 58 and runway outline 54. As described in further detail below, and with reference to FIG. 6, decluttering may include, for example, a displacement of flight information (e.g. moved up, down, left or right on PFD 14A), or a removal of flight information (if deemed irrelevant for the phase of flight).

Figure 7:
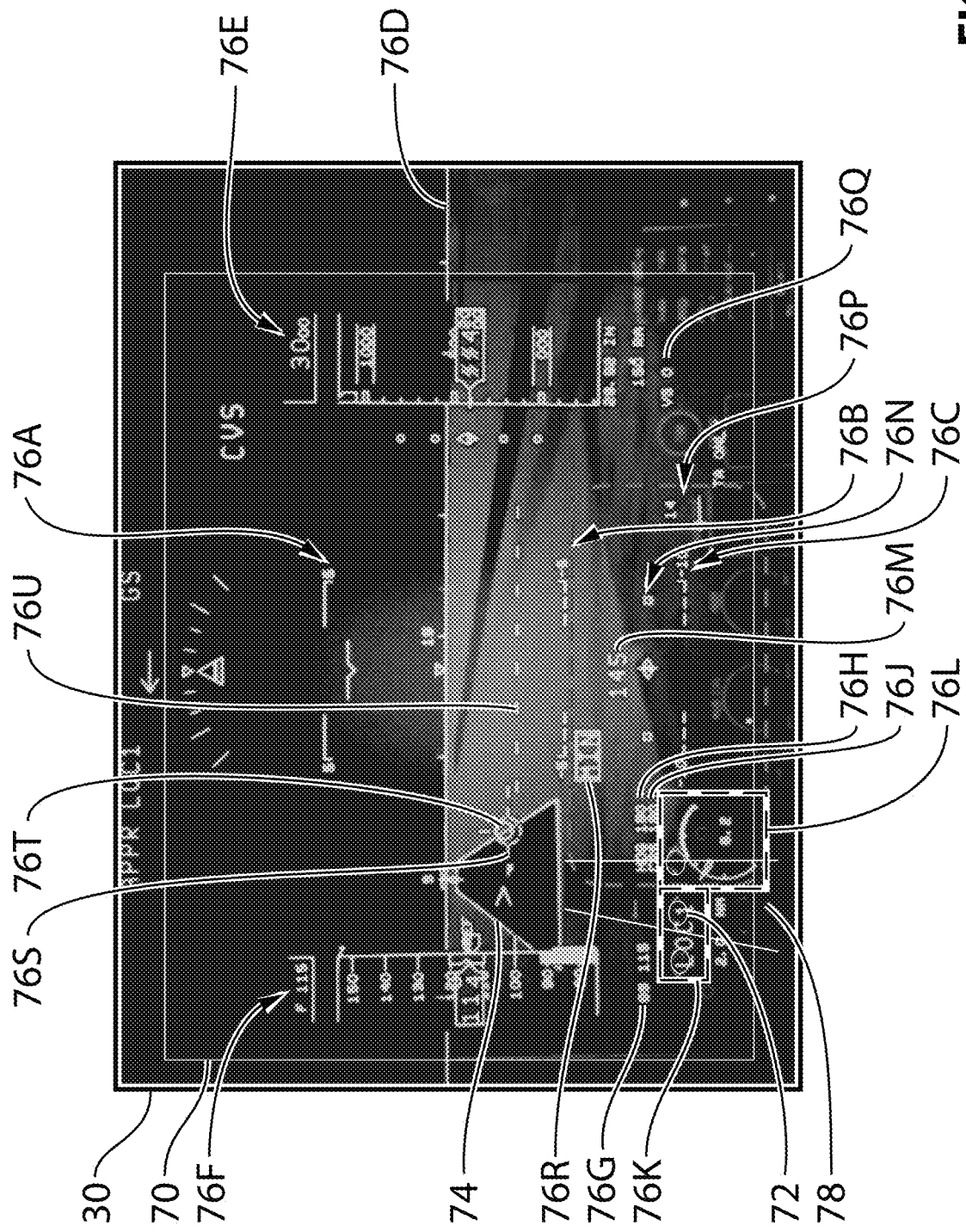
FIG. 7 is an example image of an unmodified HUD layout which combines synthetic vision generated using the synthetic vision system of FIG. 3 and enhanced vision generated using the enhanced vision system of FIG. 4, according to an embodiment.

FIG. 7 is an example of a layout displayed on HUD 30 using display system 34, including a CV image 70, that combines SV and EV information on the same image, and surrounding SV images. CV image 70 can contain SV images such as runway outline 74, outlining a destination runway.

As shown by way of example in FIG. 7, selected SV images or information can be cut out from an ALS (approach lighting system) cutout region 78 of display on HUD 30. ALS cutout region 78 can correspond to an ALS of a runway of intended landing for aircraft 10. Thus, ALS cutout region 78 can allow approach lighting to be displayed on HUD 30.

CV image 70 can include display elements such as EV images, for example, runway approach lights 72, and ALS cutout region 78 can allow for better visibility of runway approach lights 72.

CV image 70 can include display elements such as EV images, for example, runway approach lights 72, and ALS cutout region 78 can allow for better visibility of runway approach lights 72 due to the absence of SV images in the region.

FIG. 7 shows information displayed in the display area of HUD 30, which can include flight information typically found on HUD 30 and can contain symbology and data annunciation indicating information related to the aircraft's attitude, airspeed, and altitude, navigational information. The flight information can comprise a textual and/or a graphical indication. As shown in FIG. 7, some flight information may be displayed in the same vicinity and proximate ALS cutout region 78 and runway approach lights 72, as well as runway outline 74. Thus, there may be an issue of overlap or visual occlusion.

As shown in FIG. 7, in some embodiments, flight information 76 on HUD 30 can include: a 5° pitch attitude marking 76A, a −5° pitch attitude marking 76B, a −10° pitch attitude marking 76C, a horizon line 76D, an altitude tape 76E, an airspeed tape 76F, a ground speed (GS) indicator 76G, a heading (HDG) data status 76H, a course (CRS) data status 76J, a navigation source and range information 76K, an angle of attack indicator 76L, a radar altimeter readout 76M, a localizer (LOC) scale 76N for lateral deviation, a wind vector 76P, a vertical speed 76Q, a minimum (MIN) flag 76R associated with the decision height (DH) or decision altitude (DA), a flight path vector (FPV) 76S, a command guidance cue 76T, and a flight path angle reference cue (FPARC) 76U.

Systems and methods disclosed herein can improve the cluttering of flight information that may occlude visual cues that are depicted proximate ALS cutout region 78 and runway outline 74. As described in further detail below, and with reference to FIG. 8, decluttering may include, for example, a displacement of flight information (e.g. moved up, down, left or right on HUD 30), or a removal of flight information (if deemed irrelevant for the phase of flight).

Display system 34 can provide enhanced situational awareness for the flight crew and can also contribute toward obtaining an operational credit (e.g., lower operating minima) for aircraft 10 by combining the benefits of CV with suitable system/performance monitoring. The CVGS operating mode for operational credit can be more stringent than the CVS display mode for situational awareness alone. Similarly, the SVGS operating mode for operational credit can be more stringent than the SVS display mode for situational awareness alone. The CVGS operating mode can be based on a solution that blends the SVGS for operational credit, with an EVS image on a head-up display system that is providing enhanced visual cues during the visual segment. Sufficient guidance information can be provided by display system 34 and/or other aircraft systems to help the flight crew monitor the progress and safety of the approach down to the lower-than-standard decision height (e.g., lower than 200 ft, 150 ft or 100 ft) and provide alerting upon any excessive lateral and vertical deviation from the intended flight path, navigation system error or scene positioning error during the CVGS/SVGS operation. The guidance functionality of the CVGS or SVGS operating modes of display system 34 can be provided at least in part via monitors 48 that can track the lateral deviation and the vertical deviation of aircraft 10 from its intended flight path, from a standard decision height (e.g., 300 ft) down to the lower-than-standard decision height (e.g., lower than 200 ft, 150 ft or 100 ft). In addition, the guidance functionality can include suitable speed control (e.g., +10/−5 knots) to ensure that a smooth transition occurs throughout the approach, flare, landing and rollout segments. The SVGS operating mode can make use of SV without the use of EV for the purpose of assisting the flight crew in reaching the lower-than-standard decision height/altitude.

For example, monitors 48 can include flight technical error (FTE) monitoring to detect excessive lateral and vertical deviation, navigation system error and/or scene positioning error. In some embodiments, monitors 48 can monitor the integrity of aircraft systems that are relied upon during the approach for example. In some embodiments, monitors 48 can monitor the integrity of the terrain/runway/obstacle database(s) of SVS 44. Such integrity monitoring of the synthetic data can be performed by comparing with data from a radar altimeter for example.

Selection of the operating mode (for example, CVGS operating mode or SVGS operating mode) of display system 34 can be performed by way of selectable objects displayed on controller 26, and can automatically activate appropriate display modes for HUD 30 and for PFD 14A and also activate one or more monitors 48 required to benefit from the operational credit.

An SVS mode can be a display mode where SV is provided without EV. A CVS mode can be a display mode where a combination of SV and EV is provided. An SVGS operating mode can automatically and by default cause HUD 30 and PDF 14A to simultaneously display a synchronized image that includes SV without EV and activate one or more monitors 48 required to benefit from operational credit. A CVGS operating mode can automatically and by default cause HUD 30 and PFD 14A to simultaneously display a synchronized image that includes a combination of SV and EV and activate one or more monitors 48 required to benefit from operational credit.

The combination of SV and EV, together with additional system/performance monitoring, can be used to reduce the occurrence of a missed approach (e.g., go around), by allowing the SV to be validated against the EV and by providing the required visual reference(s) (such as the runway markings or runway environment) and help with monitoring the safety of the approach and landing operation to the flight crew through the EV contribution to the CV image. For example the reliance on SV and/or EV to provide the required visual reference(s), together with system/performance monitoring, can potentially permit landing and rollout to a safe taxi speed at a lower runway visual range (RVR) value which correspond to the distance over which a pilot of an aircraft on the centreline of the runway can see the runway surface markings delineating the runway or identifying its centre line.

The CVGS operating mode makes use of the SVGS operating mode that aims to bring the decision height (DH) or decision altitude (DA) to a lower-than-standard value by providing system/performance monitoring that enables an operational credit of being able to reduce the DH or DA. Once the desired decision height (DH) or decision altitude (DA) is reached, the CVGS operating mode can make use of EV to provide the visual reference required by the flight crew for landing.

As can be seen in FIGS. 5 and 7, certain aspects of ALS cutout region 58 and 78, respectively, can be visually obstructed by various other data or information displayed, such as flight information 56A-56S and 76A-76U, respectively.

In FIG. 5, for example, visibility of ALS cutout region 58 can be occluded by HSI compass rose 56F, navigation source and range information 56G and angle of attack indicator 56H. Visibility of ALS cutout region 58 can be further obstructed by radar altimeter minimum 56J and LOC scale 56K for lateral deviation, and in some embodiments, −10° pitch attitude marking (not shown).

In a scenario of a right crosswind, as shown for example in FIG. 5, the nose of aircraft 10 points to the right, and ALS cutout region 58 is shown on the left side of PFD 14A, resulting in obstruction of ALS cutout region 58 in a situation of a right crosswind.

In FIG. 7, for example, visibility of ALS cutout region 78 can be impacted by MIN flag 76R, radar altimeter readout 76M, LOC scale 76N for lateral deviation, −10° pitch attitude marking 76C, navigation source and range information 76K, angle of attack indicator 76L, wind vector 76P. The MIN flag 76R, radar altimeter readout 76M, LOC scale 76N, and −10° pitch attitude marking 76C can be items which impede the criticality of operation in low visibility conditions.

In a scenario of a right crosswind, as shown for example in FIG. 7, the nose of aircraft 10 points to the right, and ALS cutout region 78 is displayed on the left side of HUD 30, resulting in obstruction of ALS cutout region 78.

Thus, an altering, for example, decluttering, of display elements such as flight information on PFD 14A and/or HUD 30 can be performed by display system 34, for example, when a condition is met.

In some embodiments, decluttering is performed on both PFD 14A and HUD 30, although the decluttering actions performed on each display may differ.

A condition for decluttering can be, for example, a flight phase or an altitude of aircraft 10. For example, decluttering can be performed when the aircraft reaches a decision height (DH) or decision altitude (DA), or the aircraft is at an altitude that is in proximity (for example, above) DH/DA, or before the aircraft reaches the DH/DA.

In some embodiments, decluttering of HUD 30 occurs at several hundred feet above ground level (AGL), for example 600 feet, 500 feet, 400 feet, 300 feet or 250 feet.

In some embodiments, decluttering of PFD 14A occurs at several hundred feet above ground level (AGL), for example 600 feet, 500 feet, 400 feet, 300 feet or 250 feet. Decluttering can correspond to a transition from synthetic to enhanced vision. In some embodiments, decluttering of HUD 30 and/or PFD 14A can be tracked with the trigger of the MIN alert flag (i.e. 100 feet above the logic that triggers the MIN alert flag).

Decluttering of HUD 30 and/or PFD 14A may be hard coded to occur at a specified height above sea level or above ground level.

Decluttering can correspond to a transition when the lateral scale changes at key areas of an airspace (e.g., required navigation performance changes the lateral scale at 1.0 NM, or at 0.30 NM, or at 0.2 NM, or at 0.1 NM).

Decluttering can correspond to a transition when the display includes a zoom-in area that expands the lateral and vertical scale to include more precise monitoring (e.g., Highway in the Sky indicators).

In some embodiments, decluttering can be dependent on the DH/DA. In other embodiments, decluttering is independent of the DH/DA, for example, is performed at 300 feet AGL regardless of the DH/DA in accordance with the approach procedure.

It can be desirable to perform a decluttering shortly before transitioning from instrument landing (such as SVGS, CVGS, GPS based, navaid (such as radio navigation) based, or other approach types) to visual landing during an aircraft landing procedure, as the aircraft will be close enough to the runway that it is useful to do the decluttering, as EV can only pick up a certain range.

Figure 11A:
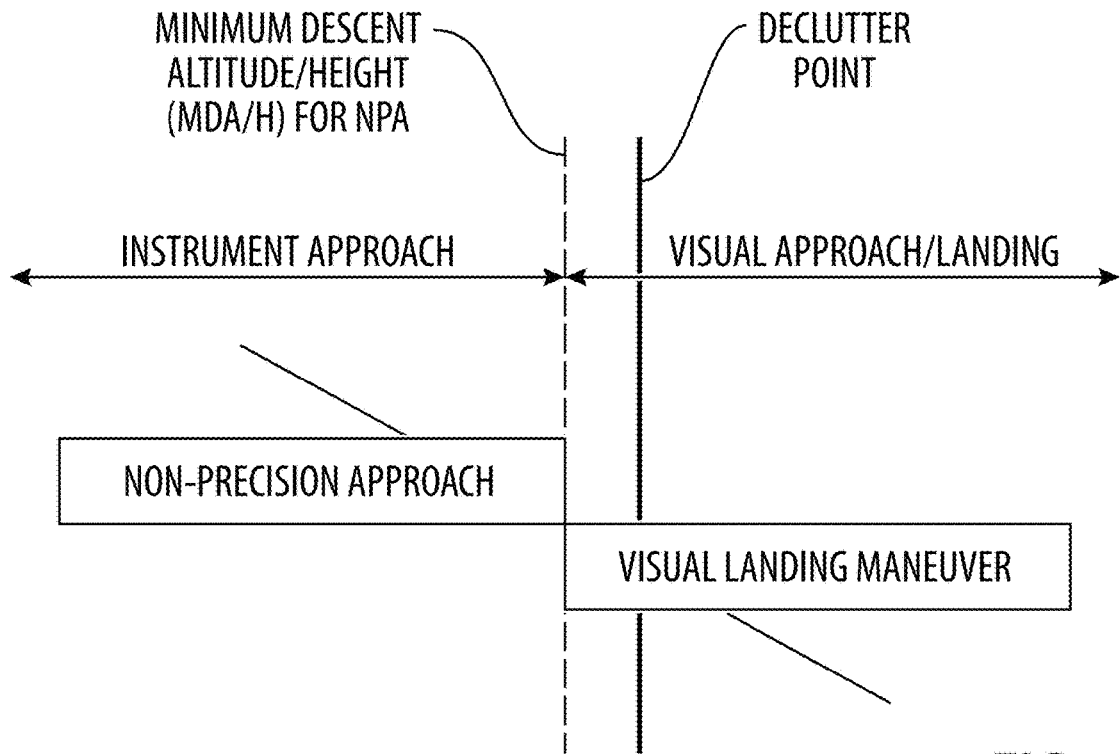
FIG. 11A a schematic representation of a transition from instrument segment to visual segment during a non-precision approach procedure, according to an embodiment.

FIG. 11A a schematic representation of an example transition from instrument segment to visual segment during a non-precision approach procedure. A non-precision approach procedure is a maneuver that guides the aircraft in its lateral path but not vertical path. Decluttering can be triggered to be performed below the operating minima ("Minimum Descent Altitude/Height (MDA) for NPA") of the non-precision approach procedure, illustrated as "Declutter Point" in FIG. 11A.

Figure 11B:
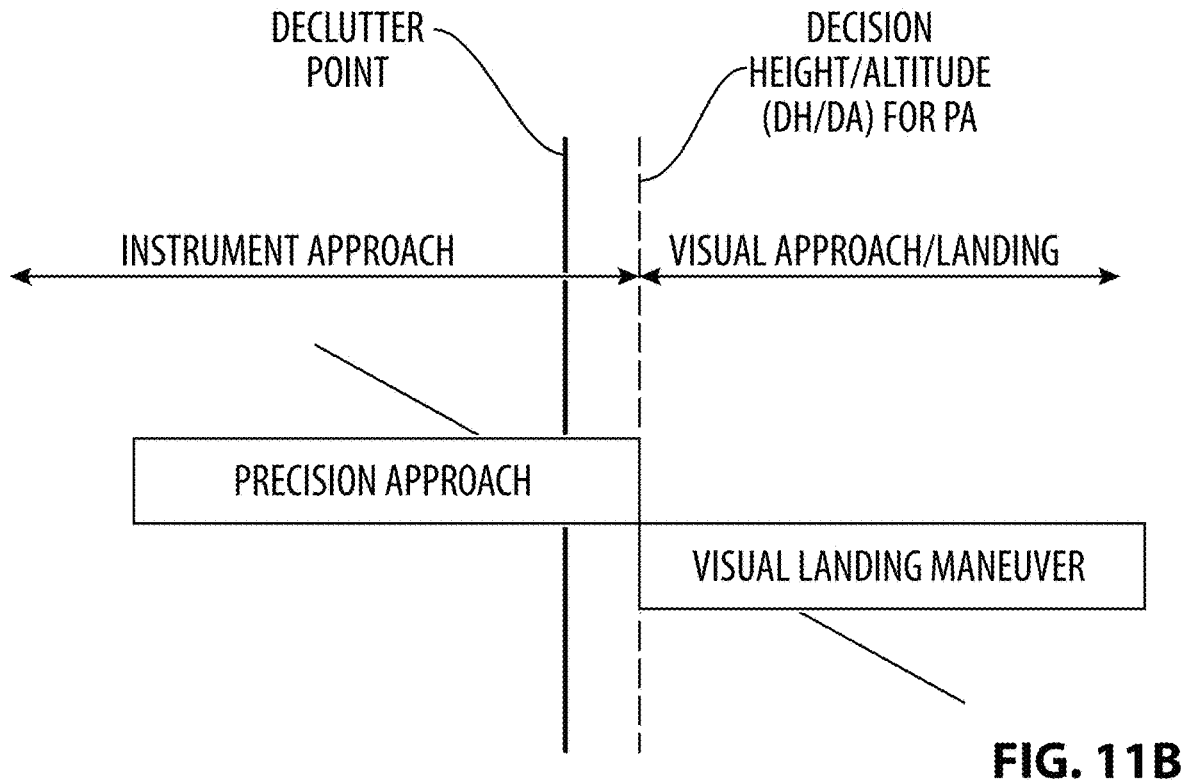
FIG. 11B a schematic representation of a transition from instrument segment to visual segment during a precision approach procedure, according to an embodiment.

FIG. 11B a schematic representation of an example transition from instrument segment to visual segment during a precision approach procedure. A precision approach procedure is a maneuver that guides the aircraft in its lateral path and its vertical path. Decluttering can be triggered to be performed slightly above the operating minima ("Decision Height/Altitude (DH/DA) for PA") of the precision approach procedure, illustrated as "Declutter Point" in FIG. 11B.

Decluttering display elements on PFD 14A and/or HUD 30 can include altering flight information to unobstruct a cutout region such as ALS cutout region 58 and/or 78, respectively. Decluttering can be performed on an area of display area of PFD 14A and/or HUD 30 that is proximate ALS cutout region 58 and/or 78, respectively.

The following alterations can be performed on a display of one or more flight information: move or translate the flight information to a different region of display, modify an orientation of the flight information, resize (for example, scale, compress or expand, crop) the flight information such as altering a font size of text of an flight information, modify a colour of the flight information, modify transparency or opacity of the flight information, remove the flight information from display (for example, if deemed irrelevant for the phase of flight), replace the flight information with a replacement flight information containing alternative data and/or images. In some embodiments, altering flight information can include reducing overlap of the flight information with a cutout region such as ALS cutout region 58 and/or 78. It will be appreciated that one or more of the above modifications can be applied, alone or in any combination, to any data or information on a display such as PFD 14A and/or HUD 30. In some embodiments, the actions can be performed using display system 34.

In some embodiments, a modification can occur instantaneously. In some embodiments, a modification can occur such that a transition is visible to a flight crew. For example, flight information can be shown moving from a first location on a display to a second location on a display, such as angle of attack indicator 56H in FIG. 5 which is moved to the left of PFD 14A in FIG. 6 following a decluttering.

Figure 6:
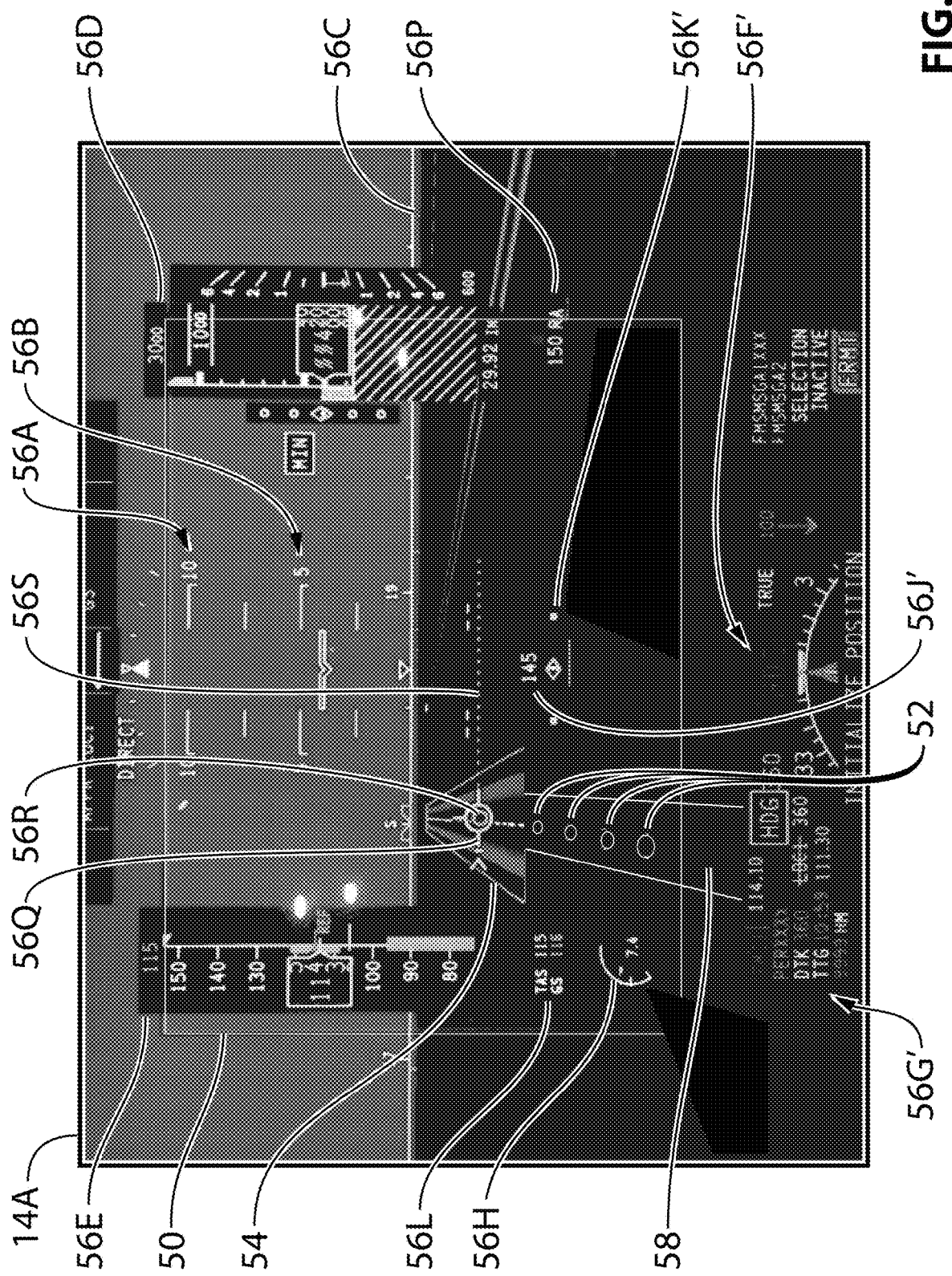
FIG. 6 is an example image of a modified decluttered PFD layout of the PFD layout of FIG. 5, according to an embodiment.

In another example, flight information can be shown resized from a large size to a compressed size on a display, such as HSI 56F in FIG. 5 replaced with a compressed HSI 56F' as illustrated in FIG. 6. In another example, altitude tape 56D or airspeed tape 56E can be compressed to only display an altitude readout, or an airspeed readout value (not shown).

In another example, transparency of flight information can be modified, such as radar altimeter minimum 56J and LOC scale 56K of FIG. 5 replaced with radar altimeter minimum 56J' and LOC scale 56K' having increased in transparency, as illustrated in FIG. 6.

In some embodiments, a removal or replacement of flight information may be displayed as a fade in or fade out of the flight information on the associated display, or other suitable transitions.

Thus, decluttering can improve the chances for a flight crew to land in low visibility conditions, especially when the depiction of visual cues within the ALS area and runway area are vital during two-way callout procedure (i.e., at the DH/DA, and then at 100 ft AGL).

Systems and methods for decluttering, as described herein, may be applied to any approach type, including, for example, SVGS and CVGS for low visibility approach, or regular visibility conditions. In some embodiments, decluttering is not performed during a steep approach.

In some embodiments, a decluttered display will immediately clear and revert to a previous layout or a normal layout (prior to the decluttering) when a reversion condition is met.

A reversion condition can include an activation of Take-off/Go-around (TOGA), for example, by actuation of a TOGA switch, or a partial thrust go-around (GA) at a specified throttle level angle, such as a partial thrust go-around performed by increasing a throttle level angle by twenty-five degrees. For example, a decluttered display can clear and revert to a normal layout when the pilot actuates the TOGA switch at the DH/DA. In another example, a decluttered display will immediately clear and revert to normal layout when a pilot does not actuate the TOGA switch, but performs a partial thrust go-around by changing the engine thrust (e.g., increasing the throttle level angle by 25 degrees).

In some embodiments, a decluttered display can be cleared and reverted to a previous layout or normal layout in sync with taxi mode operation. For example, in a taxi operation with aircraft 10 landed, aircraft 10 has landed on the runway and may be rolling down the runway and approaching a taxi lane. A display may be reverted to a previous layout, prior to decluttering, once aircraft 10 has landed on the runway, such that a normal layout is visible during taxi operation.

In some embodiments, decluttering is not be performed when a steep (STP) approach mode is selected or active on aircraft 10. Steep approach procedures are incompatible with low visibility operations because such maneuvers need to be authorized in high visibility levels.

FIG. 6 shows an example of a modified layout displayed on PFD 14A using display system 34, including CV image 50 and surrounding SV images, and altered flight information following a decluttering, resulting in a decluttered PFD 14A display.

As shown in FIG. 6, in some embodiments, altering flight information on PFD 14A during a decluttering process can include: moving angle of attack indicator 56H to another location in the display area of PFD 14A; modifying radar altimeter minimum 56J to remain in the same location and increasing its transparency, forming radar altimeter minimum 56J'; modifying localizer (LOC) scale 56K to remain in the same location and increasing its transparency to form localizer (LOC) scale 56K'; removing horizontal situation indicator (HSI) compass rose 56F and replacing it with compressed HSI 56F'; removing navigation source and range information 56G and replacing it with a compressed navigation source and range information 56G'.

Compressed HSI 56F' is a simplified view of HSI compass rose information, which includes the HDG flag, the heading reference circular scale, and the Flight Management System (FMS) message line (for e.g., "Initialize Position" as shown in FIG. 6). In some embodiments, FMS message line message can include "LPV not available", "Check fuel", "GNSS not available", and the like.

In some embodiments, altering flight information on PFD 14A can include removing a −10° pitch attitude marking. A −10 pitch attitude marking can be removed, as its usefulness during a normal approach in low visibility conditions may not be necessary. However, a −10 pitch attitude marking can be required for steep approaches. In general, steep approaches are generally incompatible with low visibility operations.

As can be seen in FIG. 6, in some embodiments, certain flight information, such as essential flight information (for example, altitude tape/readout, airspeed tape/readout, flight path vector (FPV) etc.) are not altered during a decluttering.

Conveniently, a decluttering can retain critical horizontal situation indicator indicators and flight information, and improve visibility of the lower portion of the display area of PFD 14A, including ALS cutout region 58.

In some embodiments, a "full PFD mode", in which PFD 14A occupies the entirety of its respective HDD display device, can be operationally required by Air Flight Manual (AFM) limitations for a CVGS approach. A "full PFD mode" can, for example, make use of all the real estate of a HDD display area, such as left portion 12A or right portion 12B of flight deck 12. A "half PFD mode" can only use half of the real estate of the HDD display area, such as left portion 12A or right portion 12B of flight deck 12, as the display area for PFD 14A may be shared with MFD 14B.

Figure 8:
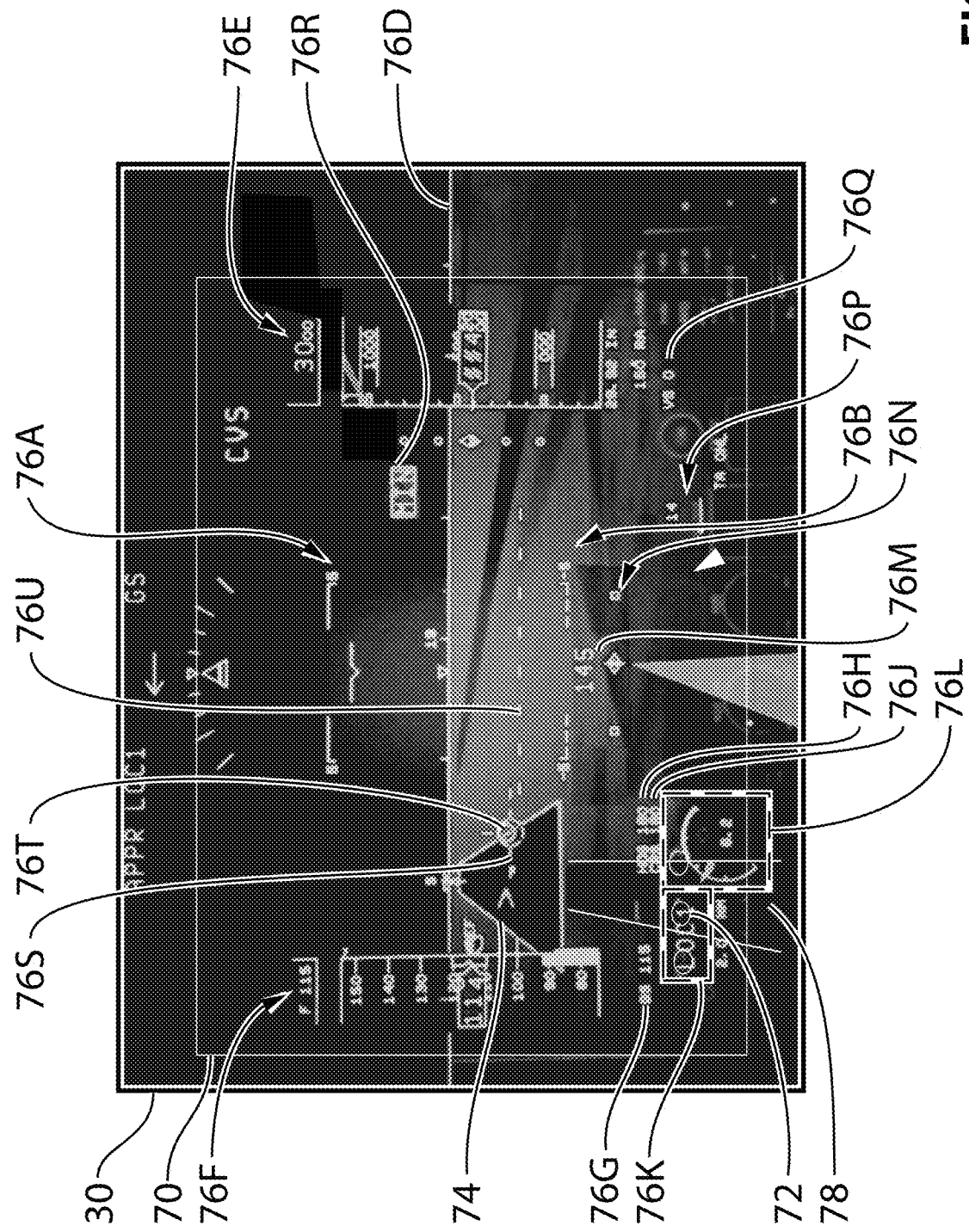
FIG. 8 is an example image of a modified decluttered HUD layout of the HUD layout of FIG. 7, according to an embodiment.

FIG. 8 shows an example of a modified layout displayed on HUD 30 using display system 34, including CV image 70 and surrounding SV images, and altered flight information following a decluttering, resulting in a decluttered HUD 30 display.

As shown in FIG. 8, in some embodiments, altering flight information on HUD 30 during a decluttering process can include: moving the location of radar altimeter readout 76M in the display area (shown as upward in FIG. 8); moving the location of localizer (LOC) scale 76N in the display area (shown as upward in FIG. 8); moving the location of MIN flag 76R in the display area; removing −10° pitch attitude marking 76C.

In some embodiments, altering flight information on HUD 30 can include modifying navigation source and range information 76K, such as moving location (not shown); modifying angle of attack indicator 76L, such as moving location (not shown).

In some embodiments, alteration of radar altimeter readout 76M, LOC scale 76N, and −10° pitch attitude marking 76C is not performed when a steep (STP) mode of aircraft 10 is selected or active.

In some embodiments, MIN flag 76R can be moved as it is no longer be required to be proximate to the flight path vector (FPV) of the display, as it may no longer be relevant during the visual landing of an aircraft landing procedure. The −10° pitch attitude marking 76C can interfere ALS cutout region 78 and ALS visibility, and may not be useful when decluttering occurs, as decluttering is not performed in a steep (STP) mode in which −10° pitch attitude marking 76C can be useful.

As can be seen in FIG. 8, in some embodiments, certain information, such as essential flight information (for example, altitude tape/readout, airspeed tape/readout, flight path vector (FPV) etc.) are not altered during a decluttering.

Conveniently, a decluttering can improve visibility of the lower portion of the display area of HUD 30, including ALS cutout region 78. As ALS lights can first appear in this area of display, decluttering can help to prevent ALS lights from being mistaken for lateral deviation scale symbology such as localizer (LOC) scale 76N.

In some embodiments, decluttering of PFD 14A can be synchronized with decluttering of HUD 30, such that altering flight information on PFD 14A is similar to altering flight information on HUD 30. In some embodiments, one or more of the same or similar changes, such as modifications as described herein, can be made on each of PFD 14A and HUD 30, and thus synchronize decluttering of PFD 14A and HUD 30.

In some embodiments, alterations to flight information can include movements to similar locations relative to the respective display area, as between PFD 14A and HUD 30.

In some embodiments, one or more of the same changes made on each of PFD 14A and HUD 30, which can include one or more of the same modifications as described herein, can occur at or around the same time.

While "decluttering" is described herein in the context of a CVGS operating mode and a combined vision image, it will be understood that in some embodiments, decluttering can be performed in the context of display system 34 such as CVS, SVS or EVS operating mode, and include modifications as described herein to an enhanced-only EV image.

Figure 10:
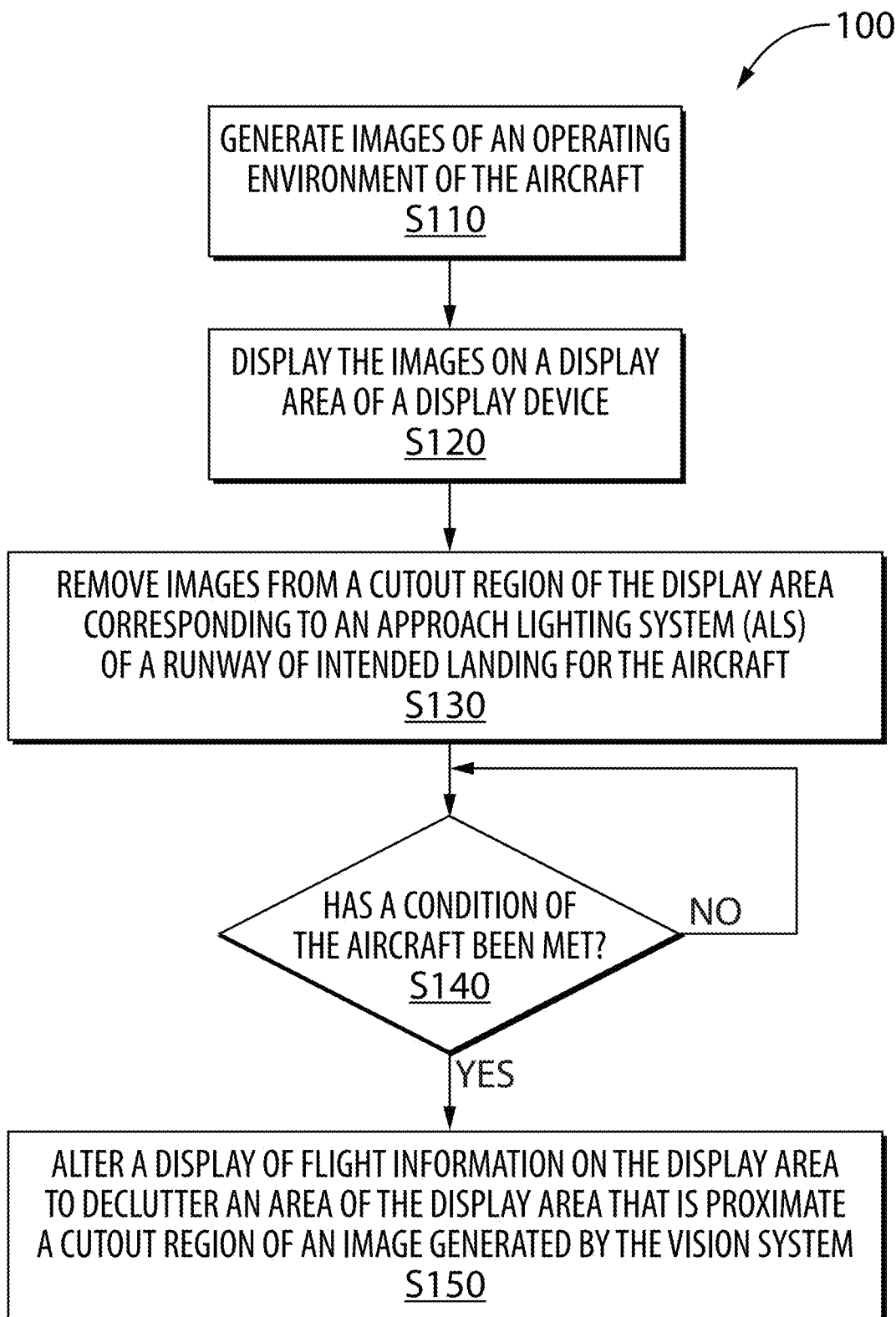
FIG. 10 is a flow diagram of an example method for decluttering a display on a display area of an aircraft, according to an embodiment.

FIG. 10 is a flow diagram of an example method 100 for altering a display on a display area of an aircraft, such as aircraft 10, to declutter the display. Method 100 can be performed using display system 34 described herein or using other systems. For example, machine-readable instructions 42 can be configured to cause computer 36 to perform at least part of method 100. It is understood that aspects of method 100 can be combined with aspects of other methods described herein.

At block S110, a vision system such as SVS 44 and/or EVS 46 generates images, for example, CV image 50 and CV image 70 and surrounding SV images, of an operating environment of aircraft 10.

At block S120, generated images are displayed on a display area of a display device, such as PFD 14A and/or HUD 30.

At block S130, images or part of images are removed from a cutout region of the display area, for example, displaying an Approach Lighting System (ALS) of a runway of intended landing for the aircraft, for example, cutout region 58 on the display area of PFD 14A and/or cutout region 78 of the display area of HUD 30. In some embodiments, synthetic vision generated by SVS 44 is removed from cutout region 58 and/or cutout region 78.

At block S140, display system 34 evaluates a condition of aircraft 10 to determine whether the condition has been met. In some embodiments, such a condition can be a decision height of 400 feet AGL to declutter HUD 30 and/or PFD 14A. In some embodiments, a condition can be a decision height of 300 feet AGL to declutter HUD 30 and/or PFD 14A. In some embodiments, a condition can be a decision height of 250 feet AGL to declutter HUD 30 and/or PFD 14A. If the condition is not met, control flow returns to block S140. When the condition is met, control flow proceeds to block S150.

At block S150, a display of flight, such as flight information 56A-56S and flight information 76A-76U on a display area can be altered to declutter an area of the display area that is proximate a cutout region, such as cutout region 58 and/or cutout region 78 of an image, such as CV image 50 and/or CV image 70 and surrounding SV images, respectively, generated by the vision system.

Altering flight information can include one or more of modifying, moving, removing and replacing the flight information, as described herein. In an example, decluttering results a transformation of the display layout of PFD 14A from FIG. 5 to FIG. 6, and a transformation of the display layout of HUD 30 from FIG. 7 to FIG. 8.

It should be understood that one or more of the blocks can be performed in a different sequence or in an interleaved or iterative manner.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A display system of an aircraft, the system comprising:
   a display device defining a display area;
   a vision system for generating an image of an operating environment of the aircraft on the display area;
   one or more data processors operatively coupled to the display device and the vision system; and
   non-transitory machine-readable memory operatively coupled to the one or more data processors and storing instructions executable by the one or more processors and configured to cause the one or more processors to:
   when a condition of the aircraft is met, cause an alteration of a display of flight information on the display area to declutter a cutout region in the image generated by the vision system, the cutout region devoid of imaging generated by the vision system and displaying an Approach Lighting System (ALS) of a runway of intended landing for the aircraft;
   wherein the alteration of the display of flight information on the display area comprises moving the flight information from a first location on the display device to a second location on the display device to unobstruct the cutout region, and wherein the condition of the aircraft comprises at least one of a flight phase and an altitude of the aircraft.

2. The display system of claim 1, wherein the instructions are configured to cause the one or more processors to: when the condition of the aircraft is met, cause an alteration of a display of flight information on the display area to declutter an area of the display area that is proximate the cutout region.

3. The display system of claim 1, wherein the vision system comprises one or more of a synthetic vision system and an enhanced vision system.

4. The display system of claim 1, wherein the cutout region is devoid of synthetic vision imaging generated by the vision system.

5. The display system of claim 1, wherein the cutout region is devoid of enhanced vision imaging generated by the vision system.

6. The display system of claim 1, wherein the instructions are configured to cause the one or more processors to: display enhanced vision in the cutout region of the display area.

7. The display system of claim 1, wherein the alteration of the display of flight information on the display area comprises replacing the flight information.

8. The display system of claim 1, wherein the alteration of the display of flight information on the display area comprises resizing the flight information.

9. The display system of claim 1, wherein the alteration of the display of flight information on the display area comprises increasing transparency of the flight information.

10. The display system of claim 1, wherein the alteration of the display of flight information comprises reducing overlap of the flight information with the cutout region.

11. The display system of claim 1, wherein the flight information comprises angle of attack information.

12. The display system of claim 1, wherein the flight information comprises attitude information.

13. The display system of claim 1, wherein the flight information comprises lateral deviation information.

14. The display system of claim 1, wherein the flight information comprises at least one of compass rose information, navigation information, course information, range information, altitude information, wind vector information, and information when selected minimums are reached.

15. The display system of claim 1, wherein the display device is a heads up display (HUD) device.

16. The display system of claim 1, wherein the display device is a heads down display (HDD) device.

17. The display system of claim 1, wherein the vision system is configured to operate in a combined vision guidance operating mode.

18. The display system of claim 1, wherein the display area includes a display area defined on a heads up display (HUD) device and a display area defined on a heads down display (HDD) device, and the alteration of the display of flight information on the display area includes an alteration of a display of flight information on the display area defined on the HUD device synchronized with an alteration of a display of flight information on the display area defined on the HDD device.

19. An aircraft comprising the display system as defined in claim 1.

* * * * *